United States Patent
Groters et al.

(10) Patent No.: US 12,240,300 B2
(45) Date of Patent: Mar. 4, 2025

(54) BELOW BELT SEAL ASSEMBLY, ASSOCIATED WINDOW SEALING SYSTEM, AND METHOD FOR MANUFACTURING SAME

(71) Applicant: Henniges Automotive Sealing Systems North America, Inc., Wilmington, DE (US)

(72) Inventors: Thomas Groters, Waterford, MI (US); Steven Johnson, Seymour, TN (US); Robert B. Krueger, Auburn Hills, MI (US); Matt Thomson, Reidsville, NC (US)

(73) Assignee: Henniges Automotive Sealing Systems North America, Inc., Wilmington, DE (US)

( * ) Notice: Subject to any disclaimer, the term of this patent is extended or adjusted under 35 U.S.C. 154(b) by 0 days.

(21) Appl. No.: 17/574,213

(22) Filed: Jan. 12, 2022

(65) Prior Publication Data
US 2022/0219519 A1 Jul. 14, 2022

Related U.S. Application Data

(60) Provisional application No. 63/136,293, filed on Jan. 12, 2021.

(51) Int. Cl.
*B60J 10/88* (2016.01)
*B60J 10/23* (2016.01)
(Continued)

(52) U.S. Cl.
CPC .............. *B60J 10/88* (2016.02); *B60J 10/23* (2016.02); *B60J 10/27* (2016.02); *B60J 10/75* (2016.02); *B60J 10/76* (2016.02)

(58) Field of Classification Search
CPC ... B60J 10/88; B60J 10/75; B60J 10/76; B60J 10/23; B60J 10/27; B60J 5/0418; B60J 5/0419; B60J 10/74
See application file for complete search history.

(56) References Cited

U.S. PATENT DOCUMENTS

| 4,834,931 A | 5/1989 | Weaver |
| 4,861,540 A | 8/1989 | Nieboer et al. |
| (Continued) |

FOREIGN PATENT DOCUMENTS

| DE | 102010001468 A1 | 8/2011 |
| EP | 1642696 A1 | 4/2006 |
| (Continued) |

OTHER PUBLICATIONS

English language abstract for de 10 2010 001 468 A1 extracted from espacenet.com database on Jan. 27, 2022, 1 page.
(Continued)

*Primary Examiner* — Daniel P Cahn
*Assistant Examiner* — Patrick B. Ponciano
(74) *Attorney, Agent, or Firm* — Howard & Howard Attorneys PLLC

(57) ABSTRACT

A below belt seal assembly for use in a window seal assembly includes an extruded strip of material extending in length between strip ends and having a base and first and second sides extending the base with each side having an engagement area and first and second lips extending outwardly from the engagement areas. A molding is formed about the base and each of the sides and terminates at the engagement areas of the sides such that the molding is spaced from the lips, with the molding forming at least one bracket bonded to the extruded strip. A fastener is attached to the bracket for facilitating mounting of the assembly to the vehicle. The window seal assembly also includes an (Continued)

upper glass run seal assembly comprising additional extruded strips of material and a second molding for bonding the below belt seal assembly to the upper glass run seal assembly.

15 Claims, 10 Drawing Sheets

(51) Int. Cl.
*B60J 10/27* (2016.01)
*B60J 10/75* (2016.01)
*B60J 10/76* (2016.01)

(56) References Cited

U.S. PATENT DOCUMENTS

| | | | |
|---|---|---|---|
| 5,374,386 A | 12/1994 | Nagata | |
| 5,407,628 A | 4/1995 | Nozaki et al. | |
| 5,711,907 A | 1/1998 | Nozaki et al. | |
| 5,972,268 A | 10/1999 | Nakajima et al. | |
| 6,428,649 B1 | 8/2002 | Gopalan | |
| 6,660,360 B2 | 12/2003 | Mertzel et al. | |
| 6,817,651 B2* | 11/2004 | Carvalho | B60J 10/75 296/146.15 |
| 6,854,786 B2 | 2/2005 | Berglund et al. | |
| 6,877,279 B2 | 4/2005 | Russell et al. | |
| 6,964,133 B2 | 11/2005 | Aritake et al. | |
| 7,175,797 B2 | 2/2007 | Kubo et al. | |
| 7,214,417 B2 | 5/2007 | Kubo et al. | |
| 7,247,362 B2 | 7/2007 | Kubo et al. | |
| 7,356,967 B2* | 4/2008 | Zwolinski | B60J 10/33 49/440 |
| 7,582,243 B2 | 9/2009 | Kubo et al. | |
| 7,740,466 B2 | 6/2010 | Kubo | |
| 8,328,975 B2* | 12/2012 | Ruppert | B60J 10/78 264/261 |
| 8,397,433 B2* | 3/2013 | Holmes | B60J 5/0402 49/502 |
| 8,479,449 B2 | 7/2013 | Titz | |
| 8,561,353 B2* | 10/2013 | Terai | B60J 1/008 49/440 |
| 9,022,446 B2 | 5/2015 | Zimmer et al. | |
| 9,085,219 B2 | 7/2015 | Wade et al. | |
| 9,114,765 B1 | 8/2015 | James et al. | |
| 9,149,961 B2 | 10/2015 | Fox et al. | |
| 9,254,733 B2* | 2/2016 | Costigan | B60J 5/0419 |
| 9,272,612 B2* | 3/2016 | Beach | B60J 10/80 |
| 9,475,374 B2* | 10/2016 | Murree | B29D 99/0053 |
| 9,649,915 B2* | 5/2017 | Inai | B60J 1/17 |
| 9,809,097 B1 | 11/2017 | Metcalf et al. | |
| 9,944,158 B2 | 4/2018 | Beach | |
| 10,399,260 B2 | 9/2019 | Lorig et al. | |
| 10,611,222 B2 | 4/2020 | Clark et al. | |
| 10,723,050 B2 | 7/2020 | Thomson et al. | |
| 10,723,320 B2 | 7/2020 | Ijima | |
| 10,751,921 B2 | 8/2020 | Sutter | |
| 10,906,219 B2 | 2/2021 | Micout | |
| 10,960,586 B2 | 3/2021 | Takahashi | |
| 11,155,012 B2 | 10/2021 | Groters | |
| 11,173,852 B2 | 11/2021 | Husek et al. | |
| 12,005,763 B2* | 6/2024 | Toyota | B60J 5/0463 |
| 2005/0003158 A1* | 1/2005 | Yamasa | B60J 10/17 264/177.1 |
| 2005/0269741 A1 | 12/2005 | Rigby et al. | |
| 2006/0005469 A1* | 1/2006 | Bara | B60J 10/74 49/440 |
| 2007/0262607 A1* | 11/2007 | Saito | B62D 65/02 296/146.2 |
| 2007/0262608 A1* | 11/2007 | Saito | B60J 10/88 296/146.7 |
| 2011/0109009 A1 | 5/2011 | Guellec | |
| 2012/0144751 A1 | 6/2012 | Schapitz | |
| 2018/0311874 A1 | 11/2018 | Thomson | |
| 2019/0160716 A1* | 5/2019 | Thomson | B29C 45/14778 |
| 2020/0156451 A1 | 5/2020 | Miyata | |
| 2020/0307361 A1 | 10/2020 | Kracht | |

FOREIGN PATENT DOCUMENTS

| | | |
|---|---|---|
| EP | 1995101 A1 | 11/2008 |
| JP | H0872100 A | 3/1996 |
| KR | 20200093118 A | 8/2020 |
| WO | 2017075028 A1 | 5/2017 |
| WO | 2019200467 A1 | 10/2019 |
| WO | 2020094083 A1 | 5/2020 |

OTHER PUBLICATIONS

English language abstract for EP 1 995 101 A1 extracted from espacenet.com database on Jan. 27, 2022, 1 page.
English language abstract for JPH 08-72100 A extracted from espacenet.com database on Jan. 27, 2022, 1 page.
English language abstract for KR 20200093118 A extracted from espacenet.com database on Jan. 27, 2022, 2 pages.

* cited by examiner

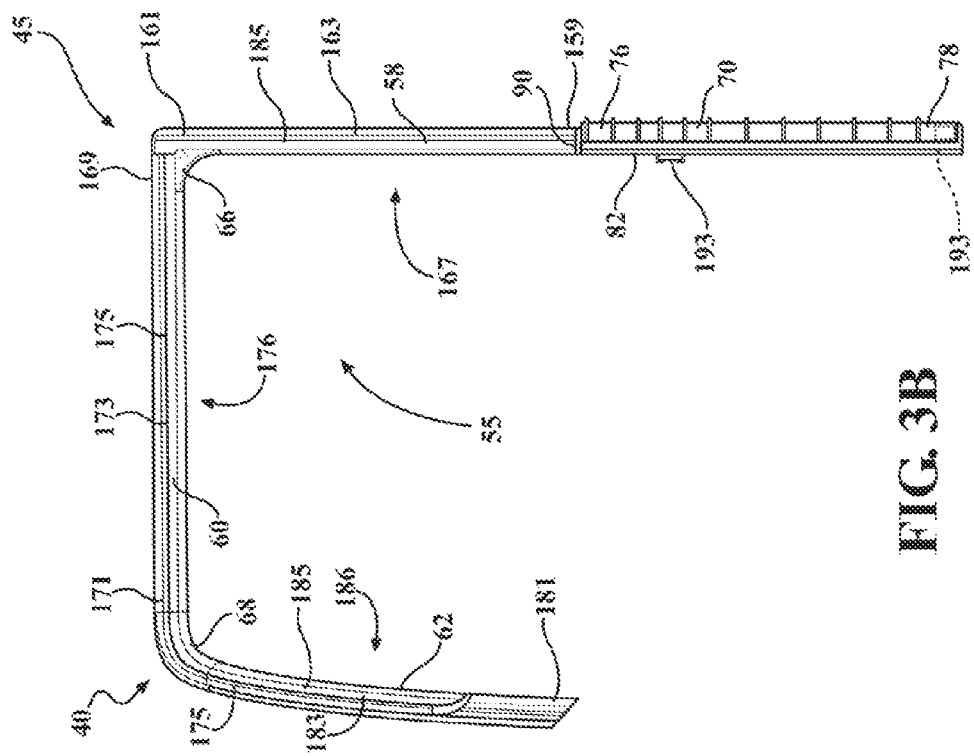
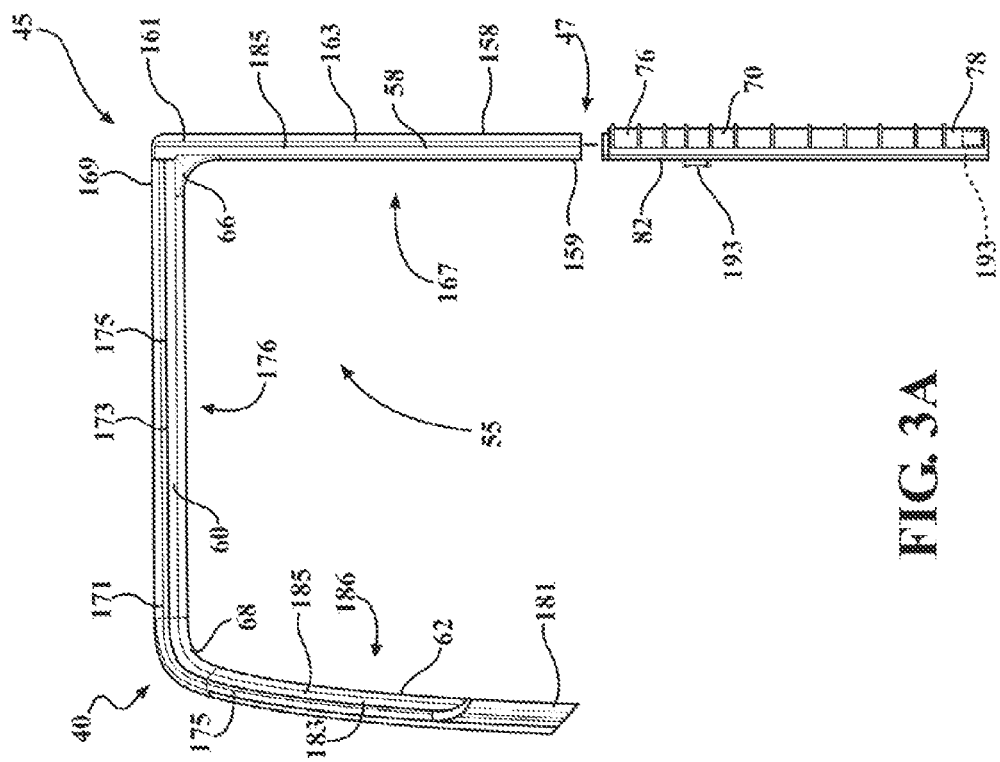

BELOW BELT SEAL ASSEMBLY, ASSOCIATED WINDOW SEALING SYSTEM, AND METHOD FOR MANUFACTURING SAME

CROSS-REFERENCE TO RELATED APPLICATIONS

This application claims the benefit of U.S. Provisional Application No. 63/136,293 filed Jan. 12, 2020, the disclosure of which is herein incorporated by reference in its entirety.

TECHNICAL FIELD

The present invention relates, generally, below belt seal assemblies including a bracket for use in window sealing systems and associated window seal assemblies, and associated methods for manufacturing same.

BACKGROUND

Conventional seal assemblies are used in a number of different industries to provide a seal between different components which may be movable relative to one another. By way of non-limiting example, seal assemblies such as weatherstrips, weatherseals, glassrun moldings, window seals, and the like are used in the automotive industry to seal between a vehicle door defining a window opening, and a glass panel supported for sliding movement relative to the door to selectively close the window opening. These conventional seal assemblies may be operatively attached to different portions of the vehicle in a number of different ways, such as with fasteners, clips, and the like.

Those having ordinary skill in the art will appreciate that seal assemblies may be manufactured in a number of different ways to suit specific vehicle application requirements. To this end, conventional seal assemblies are formed from one or more extruded members which are molded together, such as with a plastic injection process, which bonds the extruded members together at a predetermined location corresponding to a portion of the vehicle, such as at a corner of the window opening, to form a molded seal assembly such as a below belt seal assembly. In order to facilitate attachment to the vehicle, various types of clips, locators, and/or brackets are often subsequently attached to the molded seal assembly at predetermined locations which correspond to fastening locations of the particular vehicle. To this end, holes or other formations may be defined in one or more of the extruded members prior to molding, and clips, fasteners, locators, and the like may be subsequently installed into the holes/formations after the molded seal assembly has been formed.

While these below belt seal assemblies and window seal assemblies as associated methods of manufacturing such seal assemblies known in the related art have generally performed well for their intended purpose, there remains a need in the art for improvements to the seal assemblies and their associated method of manufacture.

SUMMARY OF THE INVENTION

The present invention is directed to a window sealing system for a vehicle having a movable window that includes a below belt seal assembly.

The below belt seal assembly includes an extruded strip of material extending in length between a first strip end and a second strip end, the extruded strip of material having a base and first and second sides extending from the base and with each of the first and second sides having an engagement area, with a first lip extending outwardly from the engagement area of the first side and a second lip extending outwardly from the engagement area of the second side. The below belt seal assembly also includes a molding forming at least one bracket bonded to the extruded strip of material and extending outwardly from one of the sides. The below belt seal assembly also includes a fastener attached to the bracket for facilitating mounting of the below belt seal assembly to the vehicle. The window seal assembly also includes an upper glass run seal assembly having one or more additional extruded strips of material with a portion of said upper glass run seal assembly disposed adjacent the below belt seal assembly for accepting the moveable window disposed within the below belt seal assembly.

The present invention is also directed to an associated method of manufacturing the below belt seal assembly for use in the window sealing system.

In certain embodiments, the method of manufacturing a below belt seal assembly includes the use of a mold tool having a lower mold and an upper mold with a mandrel having domed region extending transversely from the lower mold, and the mold tool having a first slide tool and a second slide tool. The method includes the step of extruding a strip of material extending in length between a first strip end and a second strip end, the strip of material having a base and first and second sides and with each of the first and second sides having an engagement area, with a first lip extending outwardly from the engagement area of the first side and a second lip extending outwardly from the engagement area of the second side. The method also includes the steps of positioning the strip of material onto the mandrel; moving the first slide tool towards the mandrel from a first position to a second position with the first slide tool moving at an angle relative to the mandrel; abutting a portion of the first slide tool with the engagement area of the first side of the strip of material when the first slide tool is in the second position to stretch the first side of the strip of material against one side of the domed region of the mandrel; moving the second slide tool towards the mandrel from a first position to a second position with the second slide tool moving at an angle relative to the mandrel; abutting a portion of the second slide tool with the engagement area of the second side of the strip of material when the second slide tool is in the second position to stretch the second side of the strip of material against an opposing side of the domed region of the mandrel; moving the upper mold towards the mandrel from an open position to a closed position to form a molding cavity defined within the upper and lower molds, the mandrel, and the first and second slide tools in the second position; directing mold material into the molding cavity to form a molding over the length of the extruded strip of material and to form at least one bracket with the mold material bonding the formed bracket to the strip of material to form the below belt seal assembly; and attaching one or more fasteners to the at least one bracket for facilitating mounting of the below belt seal assembly to the vehicle.

In either method, the steps of moving the first and second slide tool can be performed by moving the first and second slide tools diagonally or laterally. Still further, in these methods, the fastener can be loaded onto a pin on one of the slide tools and molded into the bracket during the step in which the mold material is directed into the mold cavity.

The method of the present invention for manufacturing a below belt seal assembly including a bracket, offers advantages over prior manufacturing methods for making below belt seal assemblies. In particular, the method offers a simple manufacturing process that builds upon currently available molding and extrusion processes. Also, when the below belt seal assembly is included into a window sealing system and mounted within the body of a vehicle, the formed window seal system has a nearly zero tolerance between the below belt seal assembly with the bracket and the body of the vehicle. Further, in certain embodiments in which the fastener is molded into the bracket, the present invention eliminates the potential for a missing fastener.

Further, in certain embodiments, the window sealing system and associated window sealing assembly may only utilize one fastener per bracket in the below belt seal assembly, reducing complexity in a manufacturing setting.

In further embodiments, as noted above, the present invention is also directed the attachment of the below belt seal assembly with the bracket, and the associated window seal assembly, to the vehicle.

BRIEF DESCRIPTION OF THE DRAWINGS

Advantages of the present invention will be readily appreciated as the same becomes better understood by reference to the following detailed description when considered in connection with the accompanying drawings.

FIG. 3A is a front side view of a system forming the window seal assembly of FIGS. 1 and 2 according to one exemplary embodiment with the below belt seal assembly positioned adjacent to an upper glass run seal assembly and separated by a gap.

FIG. 3B is a front side view a system forming the window seal assembly of FIGS. 1 and 2 according to one exemplary embodiment with the below belt seal assembly secured to an upper glass run seal assembly via a molding.

DETAILED DESCRIPTION

Figure 1:
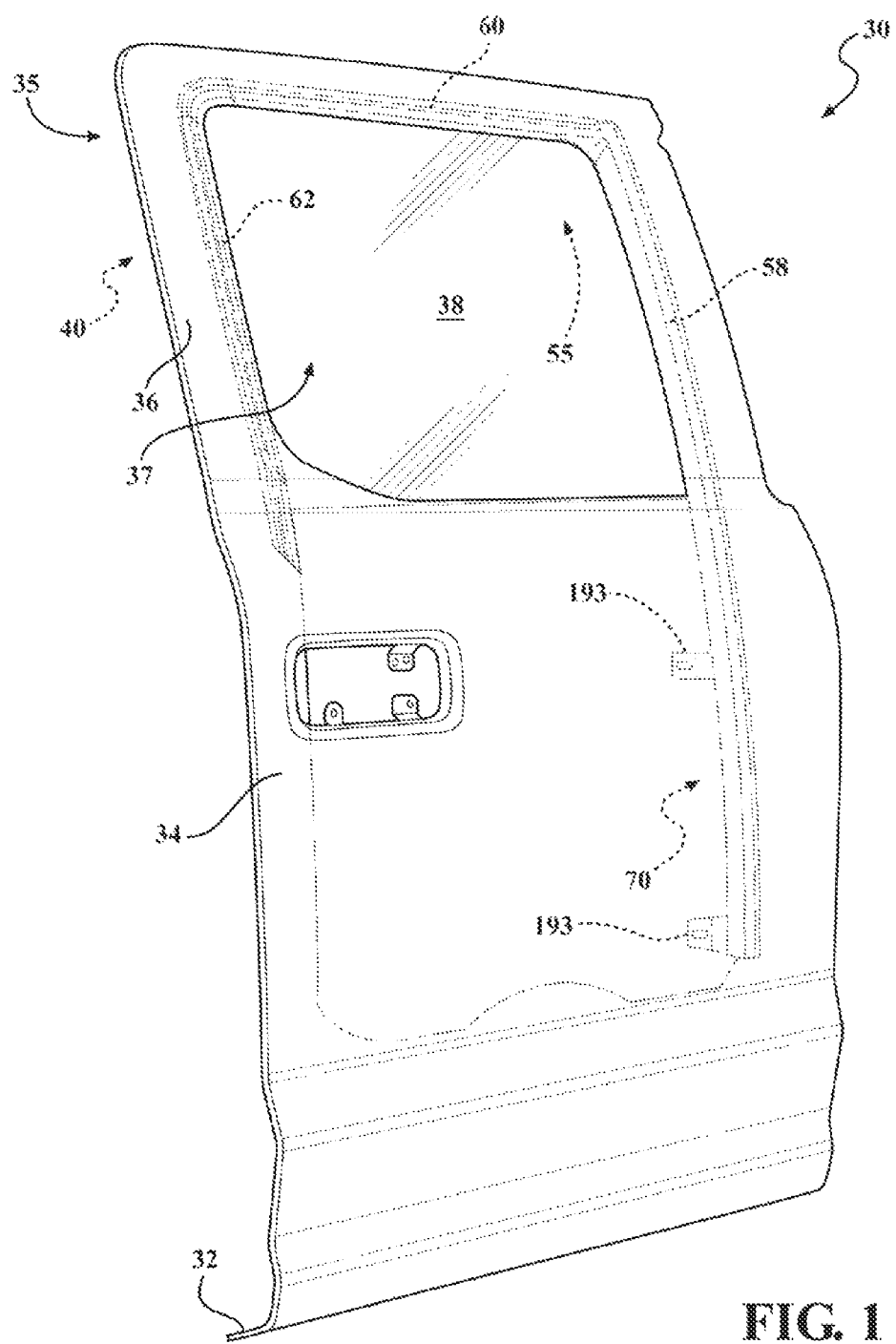
FIG. 1 is a partial side view of a door of an automotive passenger vehicle including a window seal assembly for a window contained within the door in accordance with an exemplary embodiment of the present invention with the window in a closed position.
Figure 2:
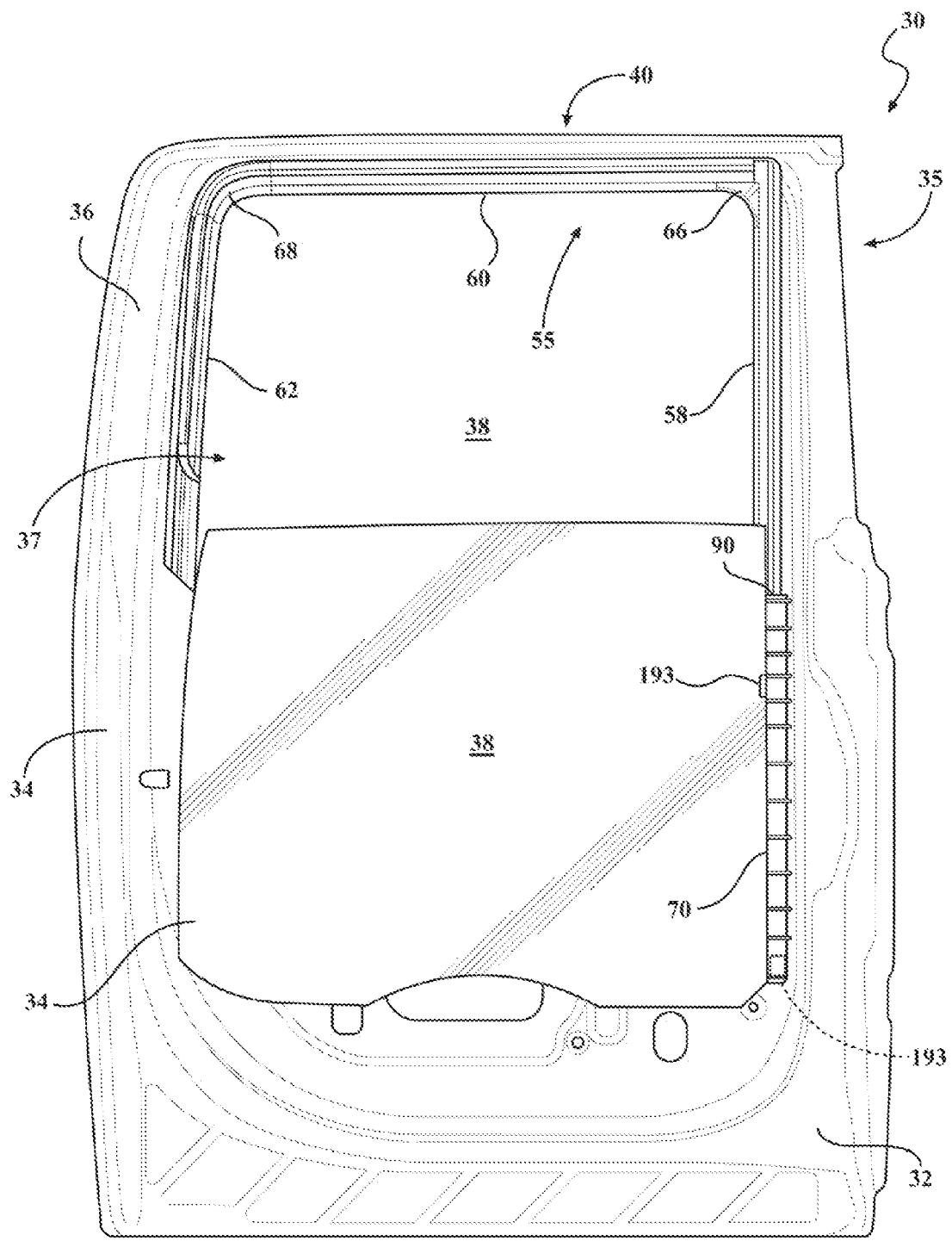
FIG. 2 is a section side view of the door of FIG. 1 with the window in an open position.

Referring now to the drawings, wherein like numerals indicate corresponding parts throughout the several views, a portion of an automotive passenger vehicle is shown at 30 in FIGS. 1 and 2. The vehicle 30 has a body, generally indicated at 32, and a plurality of doors 34 (represented by a single door 34 in FIGS. 1 and 2) coupled to the body 32. In certain embodiments, such as shown in FIG. 1, the door 34 may be considered a portion of, or extension of, the body 32.

Each of the doors 34 has a window frame 36 defining a window opening 37 that may include a window 38, and a seal assembly 40 adjacent to the window frame 36. In the representative embodiments illustrated herein and depicted throughout the drawings, the seal assembly 40 is realized as a window seal assembly 40 which is coupled to and extends along at least a portion of the window frame 36 and also supports the encapsulated glass window 38. However, those having ordinary skill in the art will appreciate that the seal assembly 40 could be realized in a number of different ways, for different vehicle 30 applications or for different types of vehicles 30, without departing from the scope of the present invention. Moreover, while the present invention is adapted for use with automotive passenger vehicles, it will be appreciated that the seal assembly 40 could be used in connection with any type of vehicle, such as heavy-duty trucks, trains, airplanes, ships, construction vehicles or equipment, military vehicles, or any other type of vehicle that utilizes seal assemblies 40.

Referring to FIGS. 3A and 3B, one embodiment of a window sealing system 45 is shown that includes a below belt seal assembly 70 and an upper glass run seal assembly 55 that, when positioned within the vehicle 30 such as shown in FIGS. 1-2, also can be defined or otherwise realized as the window seal assembly 40. In certain embodiments, as will be described below, the upper glass run seal assembly 55 may include one or more extruded strips of material operatively attached to each other and to the below belt seal assembly 70, as will be described further below.

In the embodiment illustrated in FIGS. 1-2, the upper glass run seal assembly 55 includes a first extruded strip 58 (i.e., a first strip of material 58) operatively attached to the below belt seal assembly 70, a second extruded strip 60 (i.e., a second strip of material 60) operatively attached to the first extruded strip 58, and a third extruded strip 62 (i.e., a third strip of material 62) operatively attached to the second extruded strip 60 to form the window sealing system 45 and window sealing assembly 40 as described in greater detail below. For ease of description the extruded strips of material 58, 60, 62 of the upper glass run seal assembly 55 may alternatively be referred to hereinafter as strips of material 58, 60, 62 or simply as strips 58, 60, 62. In alternative embodiments, the upper glass run seal assembly 55 only requires at least one extruded strip of material that is coupled to the In the representative embodiments illustrated herein, the extruded strips 58, 60, 62 each have a generally curved profile and are configured to seal against a window closure member 35, including sealing against the window 38, when the window closure member 35 is in the closed position (not shown in detail but generally shown in FIGS. 1 and 2, but generally known in the art). However, those having ordinary skill in the art will appreciate that the window seal assembly 40 could have any suitable profile, shape, or configuration sufficient to effect receiving the window closure member, including the window 38, in the closed position without departing from the scope of the present invention.

In the illustrated embodiments, the first extruded strip 58 is operatively attached to both the second extruded strip 60 as well as to the glass window 38 via a molding 66 which bonds the extruded strips 58, 60 together. Specifically, the molding 66 of the window seal assembly 40 couples the first extruded strip 58 and the second extruded strip 60 together in a predetermined orientation that is complimentary to the shape and orientation of the window frame 36 of the vehicle 30, as described in greater detail below. Similarly, the second extruded strip 60 is operatively attached to both the third extruded strip 62 as well as to the glass window 38 via a molding 68 which bonds the extruded strips 60, 62 together. Specifically, the molding 68 of the window seal assembly 40 couples the second extruded strip 60 and the third extruded strip 62 together in a predetermined orientation that is complimentary to the shape and orientation of the window frame 36 of the vehicle 30.

In certain embodiments, the first extruded strip 58 has a generally U-shaped profile that extending between the strip ends 159, 161 defined by a base 163, or body 163 and includes a first side 165 and a second side 166 (i.e., a first arm 165 and a second arm 165) spaced from one another and each extending transversely from the base 163. Similarly, in certain embodiments, the second extruded strip 60 and third extruded strip 62 also have a generally U-shaped profile that extending between the respective strip ends 169, 171 and 179, 181 defined by a respective base 173, 183 (or body 173, 183) that each include a first side 175, 185 and a second side 176, 186 (i.e., a first arm 175, 185 and a second arm 176, 186) respectively spaced from one another and respectively extending transversely from a respective base 173, 183.

The strips 58, 60, 62 are typically formed from a flexible and durable polymeric material that can create a seal to a component within the door 34. By way of non-limiting example, one or more portions of the strips 58, 60, 62 of material could be manufactured via a plastic extrusion process utilizing one or more predetermined materials (and hence are referred to as extruded strips of material 58, 60, 62 as noted above), such as from one or more types of EPDM (Ethylene Propylene Diene Monomer) rubber and/or TPV (Thermoplastic Vulcanized) rubber.

In the illustrated embodiments, the body 163, 173, 183 of the strips 58, 60, 62 also supports a carrier (not shown) therein, which similarly has a generally U-shaped profile. The carrier may be manufactured from metal, such as steel, or from any other suitable material, and may have other profiles (e.g., rectangular), without departing from the scope of the present invention.

In certain embodiments, the body 163, 173, 183 of the first extruded strip 58, second extruded strip 60, and third extruded strip 62 are realized as a "division bar" and includes one or more sealing lips (similar to the sealing lips 81, 83 of the strip 72 of material of the below belt seal assembly 70 described below) which are each configured to engage portions of the window closure member 37 as the window closure member 37 and window 38 moves between open and closed positions with respect to the window frame 36.

In addition to bonding the extruded strips 58, 60, 62 together, in the illustrated embodiments of the window seal assembly 40 depicted throughout the drawings, the moldings 66, 68 also at least partially encapsulates the glass window 38 and may bond to one or more locators (not shown) used to help position, align, or otherwise attach the window seal assembly 40 to the window frame 36 of the vehicle 30 in proximity to the window 38, such as via spring clips (not shown) attached to the locators. The moldings 66, 68 may also bond to other components, such as a bulb strip employed to compress against vehicle 30 trim pieces (not shown, but generally known in the related art). However, those having ordinary skill in the art will appreciate that the window seal assembly 40 could comprise a number of different arrangements of components beyond those illustrated in FIG. 3 and could be of different shapes and configurations to suit particular vehicle 30 applications and, thus, could employ additional strips and/or moldings without departing from the scope of the present invention. Furthermore, while the illustrated embodiments of the moldings 66, 68 partially encapsulating the glass window 38, it will be appreciated that the upper glass run seal assembly 55 could be provided with moldings 66, 68 which bonds the first and second and third extruded strips 58, 60, 62 together without also bonding to other components. Other configurations are contemplated.

The window seal assembly 40 further includes a below belt seal assembly 70 that is operatively attached to the upper glass run seal assembly 55 and in particular to the first extruded strip 58, and is configured to facilitate rigidly securing the window seal assembly 40 to the door 34 and/or the body 32 of the vehicle 30 at a position below the window opening 37 as shown in FIGS. 1 and 2. Here, it will be appreciated that the rigid securing of the window seal assembly 40 via the below belt seal assembly 70 affords advantages in applications where the window seal assembly 40 is relatively large and/or heavy (e.g., supports the window 38 and window closure member 35), or in applications where additional retention rigidity is required beyond the retention afforded by locators and spring clips.

Figure 4:
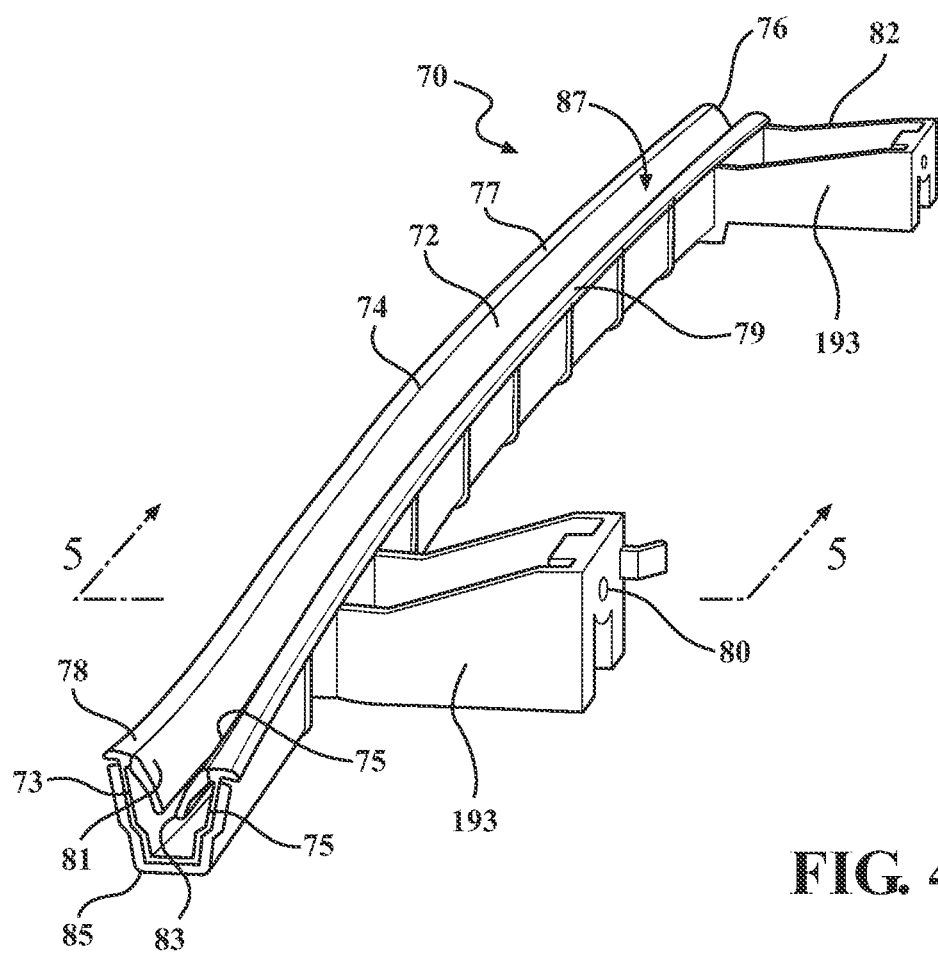
FIG. 4 is a perspective view of the below belt seal assembly prior to incorporation into the window seal assembly of FIGS. 1-3.

The below belt seal assembly 70, as shown in FIGS. 1-5 and 8-12 and as best shown in FIG. 4, includes an extruded strip of material 72 having a generally U-shaped profile and including an intermediate portion 74 extending between a first strip end 76 and a second strip end 78. The extruded strip 72 of material (see FIG. 4), similar to the extruded strips 58, 60, 62, is typically formed from a flexible and durable polymeric material that can create a seal to a component within the door 34. By way of non-limiting example, one or more portions of the strip of material 72 could be manufactured via a plastic extrusion process utilizing one or more predetermined materials, such as from one or more types of EPDM rubber and/or TPV rubber, and hence is referred to as an extruded strip of material 72, and extruded strip 72, or strip 72 hereinafter.

Also similar to the first, second and third strips 58, 60, 62, the extruded strip of material 72 includes a first side 73 and a second side 75 each extending transversely from a base 85, and in certain embodiments with each side 73, 75 extending along the entire length of the strip of material 72 between the first and second strip end 76, 78 (including along the intermediate portion 74), and with the interior surfaces of the sides 73, 75 and base 85 defining an internal channel 87 that is configured to receive, and in partially encapsulate and seal, to an outer portion of the window 38 when the window 38 is moved (i.e., lowered) within the door 34 during certain operations of the vehicle 30. In addition, each of the first and second sides 73, 75 include an engagement area 73A, 75A.

Figure 9:
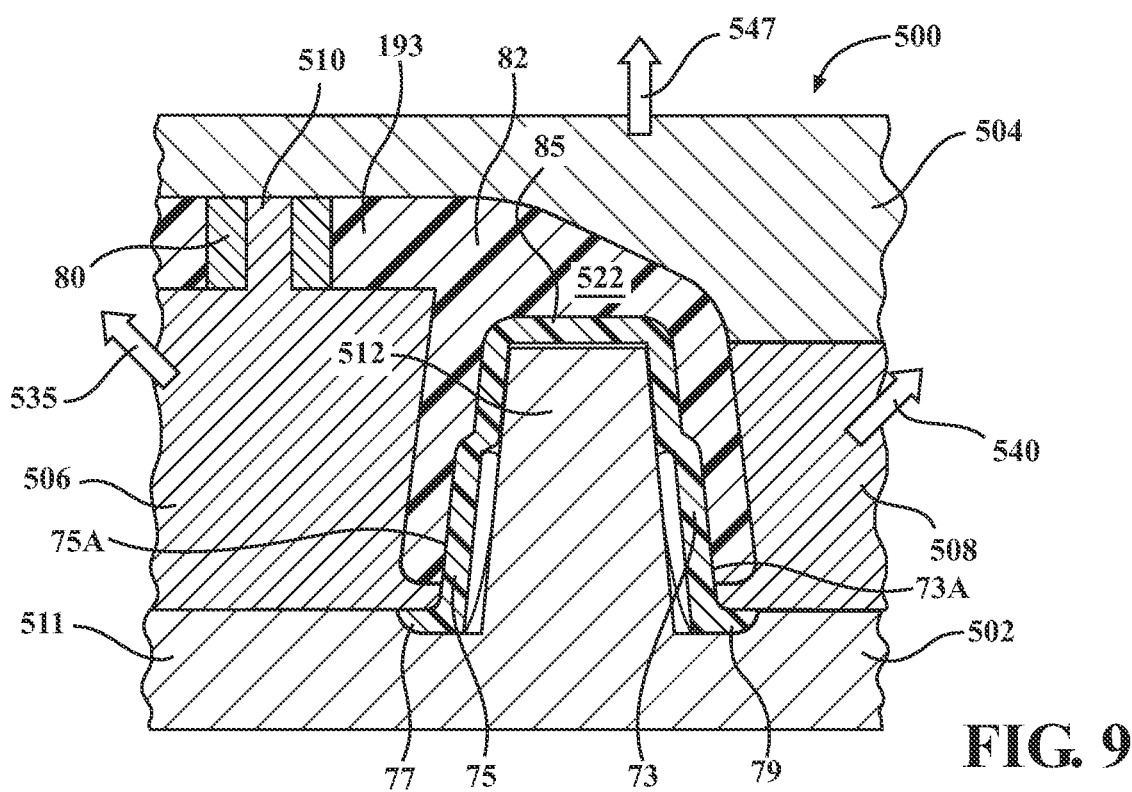

In certain of these embodiments, a terminal end of each the first and second sides 73, 75, opposite the base section 85 and adjacent to and extending from the respective engagement area 73A, 75A, form an outward lip 77, 79 (see FIG. 9). The outward lips 77, 79, may extend along all or a portion of the first and second sides 73, 75 between the first and second strip ends 76, 78 (including along the intermediate portion 74). In certain embodiments, the outward lips 77, 79 extend transverse and outwardly from the length of the sides 73, 75, and in further embodiments the outward lips 77, 79 are curved and extend transverse and outwardly to the length of the first and second sides 73, 75 at the terminal ends adjacent to and extending from the engagement areas 73A, 75A.

In still further embodiments, as also shown in FIGS. 5 and 8-12, the extruded strip of material 72 also includes an additional pair of sealing lips 81, 83 (sometimes alternatively referred to as finger like-projection portions 81, 83) extending respectively inwardly (and in a direction opposite the respective outward lips 77, 79) from one of the first and second sides 73, 75 at one or both of the respective first and second strip end 76, 78. These sealing lips 81, 83 of the strip of material 72 abut or otherwise engage portions of the window 38 of the vehicle 30 when the window 38 is moved to the lowered position within the door 34 or other portion of the body 32 when the window seal assembly 40 is coupled within the vehicle 30 and when the window 38 extends within the internal channel 87 towards the inner surface of the base section 85 when the window 38 is moved to the lowered position within the door 34 or other portion of the body 32.

In certain embodiments, the base 85, sides 73, 75 and lips 77, 79 are formed of a common polymeric material, such as the one or more types of EPDM rubber and/or TPV rubber as described above.

The below belt seal assembly 70 also includes one or more fasteners 80 that are respectively coupled, and preferably bonded, to the intermediate portion 74 and/or to one or both of the first and second strip ends 76, 78 via a molding 82 that forms at least one bracket 193, such as a plurality of brackets 193, that includes the afore-mentioned fasteners 80. In certain embodiments, and as illustrated in FIGS. 3, 5, 6, and 9-13 herein, the fastener 80 is in the form of a threaded nut 80.

In the embodiment shown, the molding 82 is bonded to the base 85 of the strip of material 72 along the entirety of the length between the first and second strip ends 76, 78 including along the intermediate portion 74, although in other embodiments the molding 82 may be bonded to either one of the first or second sides 73, 75 (alone or in combination with being bonded to the base section 85) along the entirety of the length between the first and second strip ends 76, 78 including along the intermediate portion 74. In still further embodiments, the molding 82 is bonded to the extruded strip of material 72 (along the base section 85 and/or along one or both of the first or second sides 73, 75) along less than the entirety of the length between the first and second strip ends 76, 78 including along the intermediate portion 74. In these embodiments, the first and second lips 77, 79 each extend outwardly from the sides 73, 75 at a distance at least equal to the thickness of the molding 82 disposed on the sides 73, 75.

In these embodiments, the molding 82 includes the at least one bracket 193 that are each operatively attached to the each of the fastener 80 and to the strip of material 72 such as via a molding process (by way of non-limiting example, via injection molding) with the molding 82 formed from a thermoplastic material such as Polypropylene (PP) or High-Density Polyethylene (HD-PE).

Figure 5:
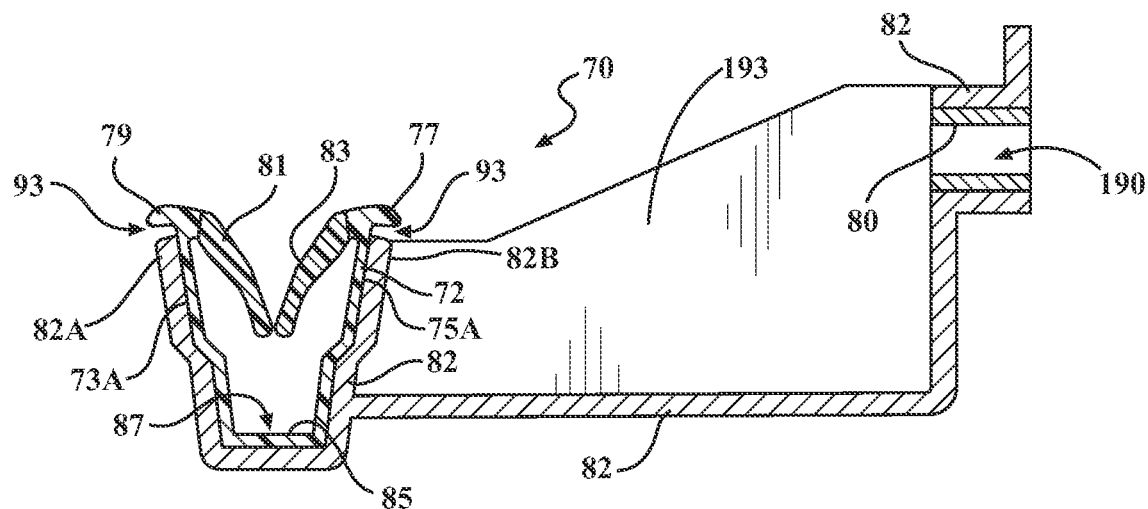
FIG. 5 is a side section view of the below belt seal assembly of FIG. 4 taken along line 5-5.

In certain embodiments that include the outward lips 77, 79, such as shown in FIG. 5, the terminal ends 82A, 82B of the molding 82 partially surrounding the base section 85 and sides 73, 75 terminate at the respective engagement areas 73A, 75A and are thus spaced from the outward lips 77, 79 lips so as to provide a gap 93 between the terminal ends 82A, 82B of the molding 82 and the respective outward lip 77, 79.

Figure 11:
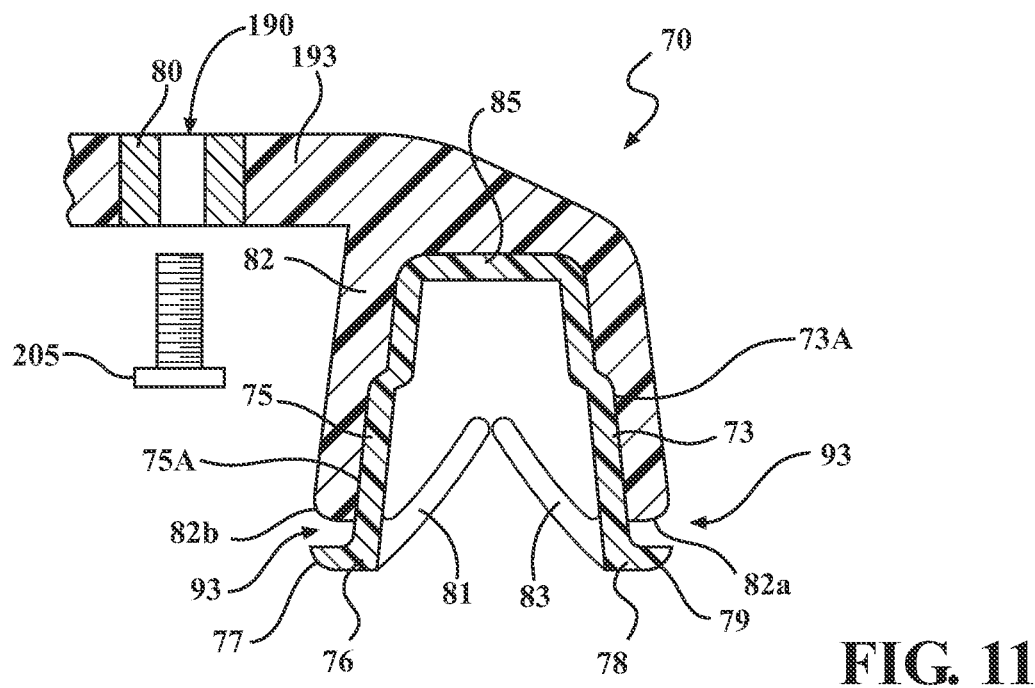
FIG. 11 is a side view of the below belt seal assembly removed from the mold in FIGS. 7-10 and including an additional fastener for subsequently attaching the below belt seal assembly to the vehicle.
Figure 12:
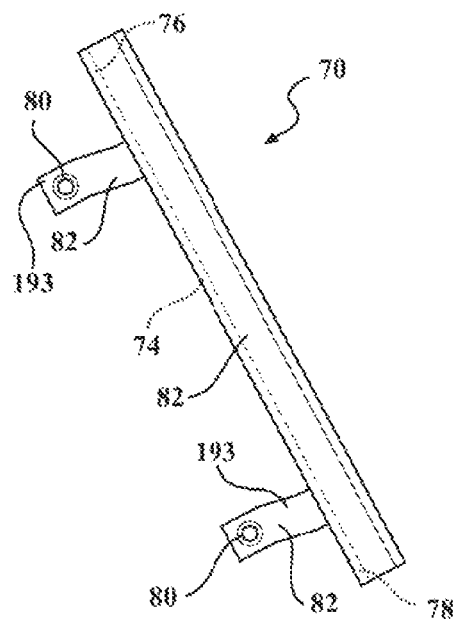
FIG. 12 is a side view of the below belt seal assembly formed in the process of FIG. 6A and corresponding to the perspective view of the below belt seal assembly of FIG. 4.

The fasteners 80 can be in the form of a threaded nut 80 as described above (see in particular FIG. 5), or alternatively may take on other forms such as a threaded bolt. In certain embodiments such as when the fastener 80 is in the form of a threaded nut 80, the fasteners 80 define access openings (access opening is shown in FIG. 5 by arrow 190) for introduction of an additional fastening device 205 therethrough that cooperate with the fasteners 80 (i.e., engages with the fastener 80) to secure the window seal assembly 40 within the door 34 or within other portions of the body 32 of the vehicle 30. By way of example, where the additional fastening device is a threaded bolt 205 such as shown in FIG. 11, and wherein the fastening device is a threaded nut 80 as also shown in FIG. 11, the threaded bolt 205 may be introduced through the access opening 190 of the threaded nut 80, while being threadingly engaged to the threaded nut 80 within the access opening 190, and with a portion of the bolt 205 extending within the body 32 (or door 34) of the vehicle 30 (such as being threadingly engaged with an opening in the body 32) to secure the below belt seal assembly 70 (and hence the window seal assembly 40 including the below belt seal assembly 70) to the body 32 (or door 34) of the vehicle 30.

Even still further, other additional fasteners or fastening devices (not shown) that are not threaded may be utilized in conjunction with the fasteners 80 described herein in further alternative embodiments, including for example spring clips or u-nuts or other additional fastening devices having hook-like features (not shown) that are bonded to the intermediate portion 74 and function for securing the window seal assembly 40 to the door 34 or the body 32 of the vehicle 30.

In the representative embodiments depicted herein, the below belt seal assembly 70, is formed in-place such as via a molding process (by way of non-limiting example, via injection molding) from a thermoplastic such as Polypropylene (PP) or High-Density Polyethylene (HD-PE) within a mold (shown schematically in FIGS. 7-10) according to the logic illustrated in FIG. 6A and as described below. Once formed, the below belt seal assembly 70 may be coupled with the one or more of the three extruded strips 58, 60 and 62 that individual or collectively define the upper glass run seal assembly 55 to form the window seal assembly 40.

In certain embodiments, the below belt sealing system 70 may be subsequently positioned adjacent to the first extruded strip 58 of the upper glass run seal assembly 55, such as shown in FIGS. 3A and 3B. As shown in FIG. 3A, the below belt sealing system 70 is positioned adjacent to the first extruded strip 58 with a small gap 47 present between the first strip end 76 of the extruded strip 72 and the strip end 159 of the first extruded strip 58 to form the window sealing system 45. In certain other embodiments as shown in FIG. 3B, the below belt seal assembly 70 may abut and/or may be subsequently bonded to the first extruded strip 58 of the upper glass run seal assembly 55. The bonding could be accomplished through an additional molding 90 in an additional or concurrent molding process. Those having ordinary skill in the art will appreciate that the below belt seal assembly 70 could be formed from any suitable material sufficient to align, abut, or bond to the first extruded strip 58 and to facilitate proper alignment of the window seal assembly 40. As yet another alternative, an adhesive (not shown) may be applied between the first strip end 76 and the strip end 159 of the first extruded strip 58, without departing from the scope of the present invention.

In the embodiment illustrated in FIGS. 1-2 and in FIG. 3B, the three strips 58, 60 and 62 are illustrated and are coupled together and form the upper glass run seal assembly 55 that are secured together and to the below belt seal assembly 70 via the moldings 66, 68 and 90 as described above. However, in other embodiments, the window seal assembly 40, in accordance with the present invention, can include the below belt seal assembly 70 coupled to the first extruded strip 58 with or without the additional extruded strips 60, 62 (i.e., the upper glass run seal assembly 55 can include the first extruded strip 58 alone or in combination with one or both of the additional strips 60, 62). Still further, in additional embodiments, the number of additional extruded strips can be more than the two additional extruded strips 60, 62 as shown.

Even still further, while the present invention as illustrated in FIGS. 1-5 includes a first extruded strip 58 coupled to the first strip end 76 of the extruded strip of material 72 via the molding 90, alternative embodiments are contemplated.

By way of non-limiting examples (not shown), an additional strip of extruded material similar to the first extruded strip 58 may also be coupled to the second strip end 78 of the extruded strip of material 72 via an additional molding similar to the molding 90. Still further, the additional strip of extruded material may alternatively be coupled to the intermediate portion 74 of the extruded strip of material 72 via an additional molding similar to the molding 90. Even still further, an additional extruded strip of material similar to the first extruded strip 58 may also be coupled to the second strip end 78 of the extruded strip of material 72 and a second additional strip of material may be coupled to the intermediate portion 74 of the extruded strip of material 72 via an additional molding or moldings similar to the molding 90.

A molding method for forming the below belt seal assembly 70 similar to the embodiment illustrated in FIG. 4 (and as shown in FIG. 11), and the subsequent method for forming a window seal assembly 40 including the below belt seal assembly 70 and the upper glass run seal assembly 55 of FIGS. 1-2 is depicted generically in FIGS. 7-10 and in an accompanying logic flow diagram 200 in FIGS. 6A and 6B in accordance with one exemplary method of the present invention.

Figure 6A:
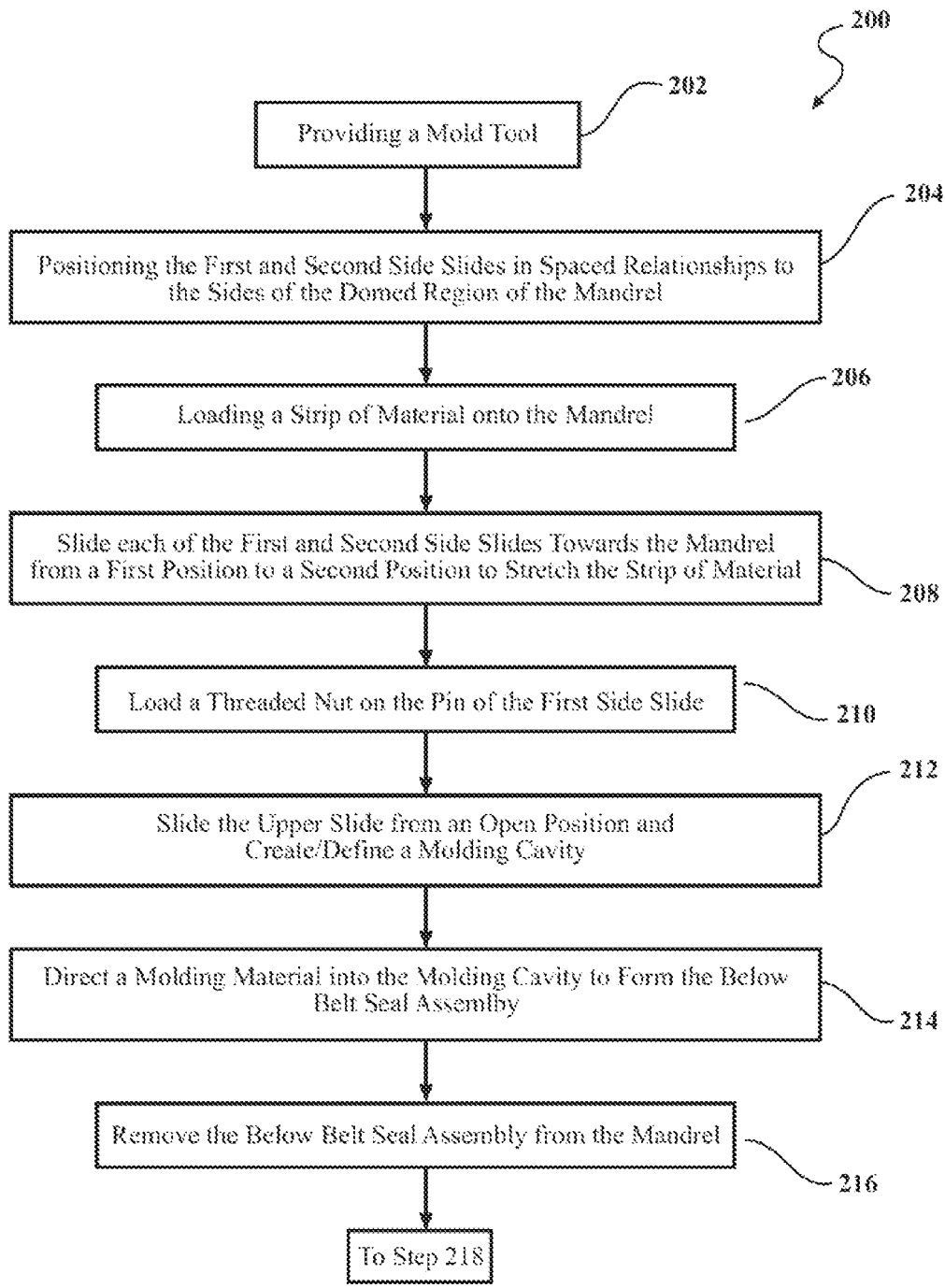
FIG. 6A is logic flow diagram of process for forming the below belt seal assembly according to an alternative configuration to the below belt seal assembly of FIG. 4.

Referring first to FIG. 6A and to step 202, the method 200 begins by providing a mold tool. The mold tool, shown in FIGS. 7-10 by reference numeral 500 and illustrated schematically and not intended to provide precise dimensions or configurations corresponding to the formed below belt seal assembly 70 of the present invention, includes a mandrel 502, an upper slide 504, and a pair of slide tools 506, 508 with a first one 506 of the pair of slide tools including a pin 510. The pin 510 may be coupled to or be integrally formed and project outward from the first one 506 of the slide tools. The mandrel 502 has a base region 511 and domed region 512 extending transversely from the base region 511. The base region 511 includes a trough region 513 defining a cavity 515 positioned adjacent to the domed region 512. In certain embodiments, the domed region 512 includes a top side 514 with a first side 516 and an opposing second side 518 extending from the top side 514. The sides 516, 518 of the domed region 512 may each include a pocket region 523 for receipt of the sealing lips 81, 83. In alternative embodiments, the pin 510 could alternatively be coupled to be integrally formed and project outwardly from the upper slide tool 504 and work in the same manner as the pin 510 coupled to or integrally formed with the first one 506 of the slide tools as shown in FIGS. 7-10. The method continues in step 204 by positioning the first slide tool 506 in spaced relationship from the first side 516 of the mandrel 502 and positioning a second slide tool 508 in spaced relationship to the second side 518 of the mandrel 502.

Figure 7:
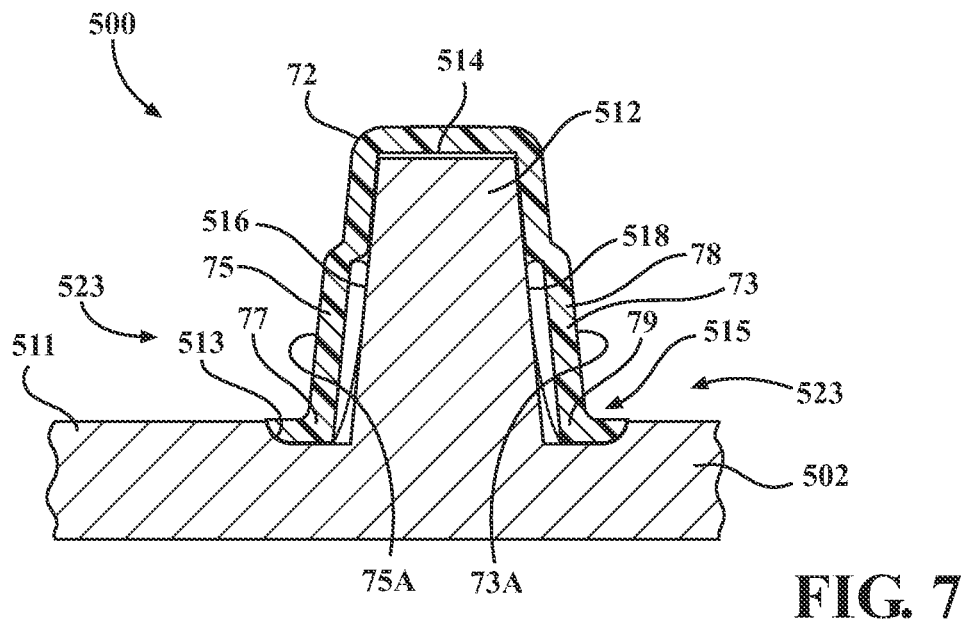
FIGS. 7-10 are various schematic illustrations of the mold tool used to form the below belt seal assembly generally according to the method of FIG. 6A.

Next, in step 206 and as best shown in FIG. 7, a strip of material 72 (i.e., the extruded strip of material 72 previously formed by the plastic extrusion process) having an intermediate portion 74 extending between a first and second strip end 76, 78 is loaded onto the mandrel 502 with the first strip end 76 positioned between the first side 516 of the domed region 512 of the mandrel 502 and the first slide tool 506 and with the second strip end 78 positioned between the second side 518 of the domed region 512 of the mandrel 502 and the second slide end 508 with the intermediate portion 74 positioned adjacent the top side 514 of the domed region 512 of the mandrel 502. In alternative embodiments, step 206 can proceed prior to, or simultaneous with, step 204.

In certain embodiments the ends of the sides 73, 75 of the strip of material 72 opposite the base 85 extend into cavity 515 defined by the trough region 513. Further, in certain of these embodiments that include the outward lips 77, 79, a terminal end or the entirety of each the outward lips 77, 79 is positioned within the cavity 515 defined by the troughed region 513.

As noted above, as also shown in FIGS. 7-10, the strip of material 72 also includes the additional pair of sealing lips 81, 83 extending respectively inwardly from one of the first and second sides 73, 75 at one or both of the respective first and second strip end 76, 78 and these are positioned within the respective pocket region 523 along the sides 516, 518 of the domed region 512.

Next, in step 208, each of the pair of slide tools 506, 508 is moved (i.e., slid) towards the mandrel 502, such as towards the domed region 512 of the mandrel 502, from a first position to a second position to stretch the strip of material 72 against the mandrel 502, such as against the domed region 512 of the mandrel 502. This sliding of the pair of slide tools 506, 508 can be done simultaneously or sequentially (in either order).

In certain embodiments, the pair of slide tools 506, 508 are slid diagonally (shown by arrows 525, 530 in FIG. 8) towards the mandrel 502 from the first position to the second position.

In certain embodiments, during this diagonal movement, a projection 517, 519 of the respective pair of slide tools 506, 508 covers a portion of the first and second sides 73, 75 within the cavity 515 adjacent to the troughed portion 513, and in particular is brought into contact with the engagement area 73A, 75A of the first and second sides 73, 75 of the strip of material 72 and stretches the first and second sides 73, 75 along the respective opposing first and second sides 516, 518. In embodiments including the outward lips 77, 79, such as shown in FIG. 9, a projection 517, 519 of the respective pair of slide tools 506, 508 are brought into contact with the engagement area 73A, 75A of the first and second sides 73, 75 at a position adjacent to the respective outward lips 77, 79.

Figure 8:
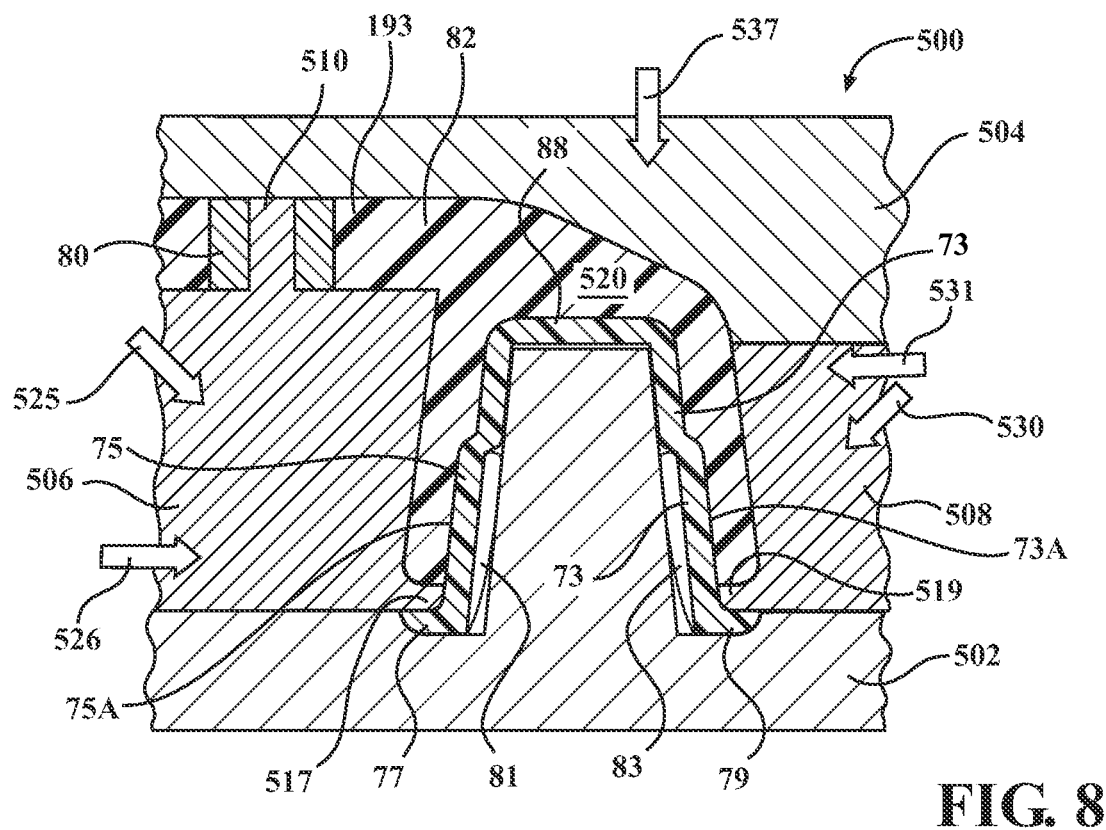

Alternatively, as also shown in FIG. 8, the pair of slide tools 506, 508 are slid laterally (shown by arrows 526, 531 in FIG. 8) towards the mandrel 502 from the first position to the second position by essentially the same method as described above.

Next, in step 210 in certain embodiments, the fastener 80, such as a threaded nut 80, is loaded onto the pin 510 of the first slide tool 506 (see FIG. 8) with the access opening 190 defined the threaded nut 80 surrounding and in close proximity or in contact with the outer surface of the side of the pin 510. In certain of these embodiments, step 210 can occur prior to or simultaneous with step 206 or 208.

The location of the pin 510 along the first one 506 of the slide tools is illustrated schematically in FIGS. 7-10, is illustrated for ease of illustration in an alternative location from a pin 510 that would be used to form the below belt seal assembly 70 of FIG. 4. In particular, the location of the pin 510 in FIGS. 7-10 forms the below belt seal assembly 70 as illustrated in FIG. 11 having the access opening 190 extending in a direction ninety degrees offset from the corresponding access opening 190 in the below belt seal assembly 70 illustrated in FIG. 4. Still further, in alternatives to the illustration of FIGS. 7-10, the pin 510 could alternatively be coupled to or extend from the upper slide tool 504 or be positioned in alternative locations on the first one of the slide tools, and work in the same manner as the pin 510 coupled to or extending from the first one 506 of the slide tools as shown in FIGS. 7-10.

As noted above, the fastener 80 described in step 210 may take on alternative forms, including that of another threaded fastener such as a threaded bolt or a non-threaded fastener including but not limited to a spring clip, u-nut or a fastener having a hook-like feature. In these embodiments, the use of the pin 510, and the loading of the fastener 510 onto the pin 510, are not necessary. In addition, is still further alternative embodiments, the fastener 80 can be coupled to the formed one or more brackets 193 after formation of the below belt seal assembly 70.

In step 212, the upper slide 504 is slid towards the mandrel 502, and in particular towards a top side 514 of the domed region 512 of the mandrel 502, from an open position to a closed position, as shown by arrow 537 in FIG. 8, wherein the upper slide 504, the pair of slide tools 506, 508, the projections 517, 519 and the mandrel 502 define a molding cavity 520 therebetween when the pair of slide tools 506, 508 are in the first position and when the upper slide 504 is in the closed position. During step 212, the fastener 80 and the strip of material 72 are contained in the molding cavity 520. In certain embodiments, step 210 can occur prior to or simultaneous with step 208 or 210.

In step 214, and as also represented in FIG. 8, a molding material 522 is directed into the molding cavity 520 to form a molding 82 that bonds the fastener 80 to the extruded strip of material 72 to form the below belt seal assembly 70. During this step, one or more brackets 193 are formed within the molding material 522 that include the fasteners 80 or serve as the location for the subsequent attachment of the fasteners 80.

In step 216, the upper slide 504 is retracted to the open position (shown by arrow 547 in FIG. 9 or FIG. 10) and the pair of slide tools 506, 508 are retracted from the second position back to the first position, thereby allowing the formed below belt seal assembly 70 to be removed from the mandrel (see FIG. 11 in which the below belt seal assembly 70 is removed). Optionally, the sealing lips 81, 83 may be removed from the formed below belt seal assembly 70 as a part of step 214.

In certain embodiments, as shown in FIG. 9, the pair of slide tools 506, 508 are slid diagonally (shown by arrows 535, 540) away from the mandrel 502 from the second position to the first position. The diagonal sliding of FIG. 9 corresponds to the embodiment also illustrated in FIG. 8 described above wherein the pair of slide tools 506, 508 are slid diagonally towards from the mandrel 502 illustrated by arrows 525, 530 and corresponding to Step 208.

Figure 10:
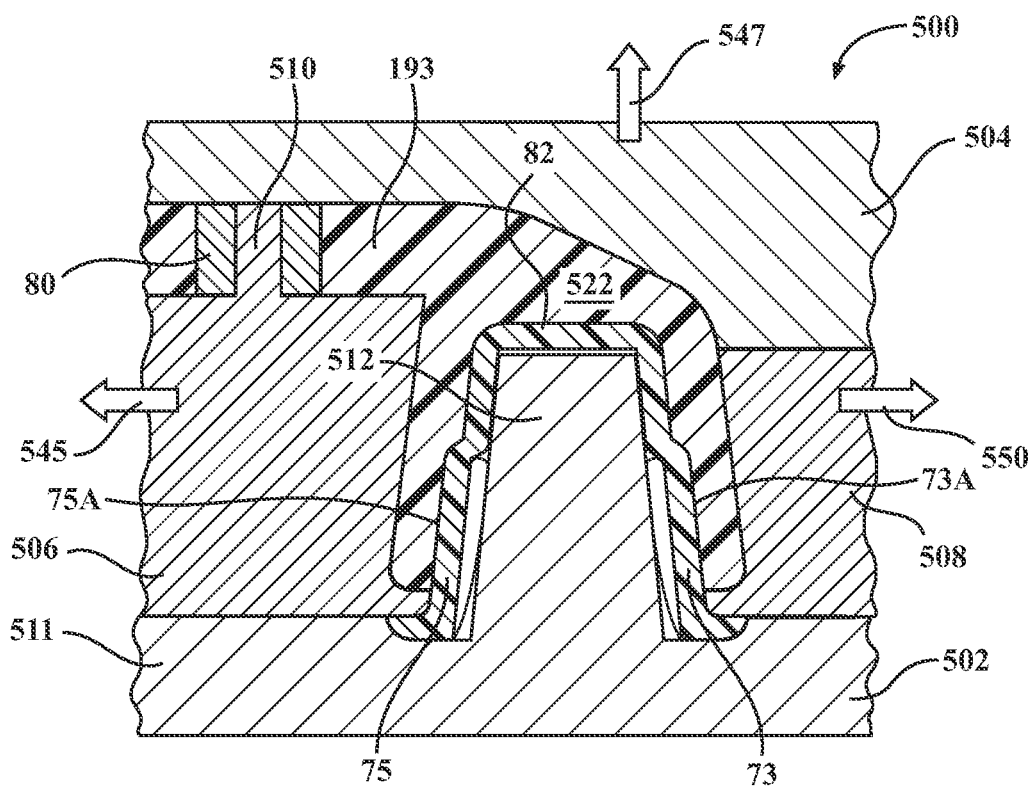

Alternatively, as shown in FIG. 10, the pair of slide tools 506, 508 are slid laterally (shown by arrows 545, 550) away from the mandrel 502 from the second position to the first position. The lateral sliding of FIG. 10 corresponds to the embodiment also illustrated in FIG. 9 described above wherein the pair of slide tools 506, 508 are slid laterally towards from the mandrel 502 as shown by arrows 526, 531 and corresponding to Step 208.

In certain embodiments, during this diagonal or lateral movement shown by arrows 535, 540 or 545, 550, the projection 517, 519 of the respective pair of slide tools 506, 508 uncovers the sides 73, 75 (and is disengaged from the engagement area 73A, 75A) within the cavity 515 adjacent to the troughed portion 513 and is brought out of contact with of the strip of material 72 corresponding to the sides 73, 75. In embodiments that include the outward lips 77, 79, this diagonal or lateral movement also uncovers a top portion of the outward lips 77, 79 adjacent to, and extending from, the sides 73, 75 to expose the gap 93 created between the terminal ends 82A, 82A of the molding 82 and the top surface of the outward lips 77, 79.

Figure 6B:
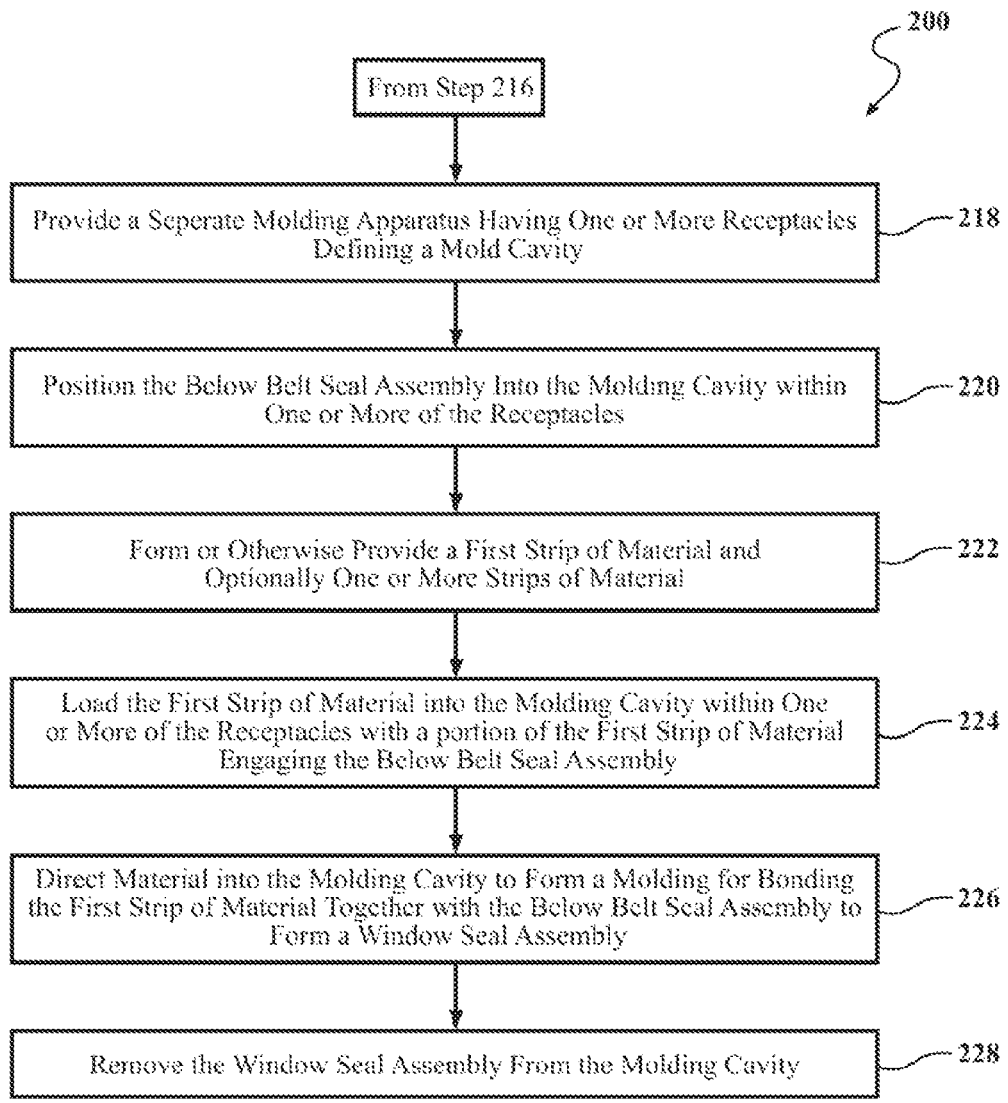
FIG. 6B is a logic flow diagram of the subsequent formation of the system and window seal assembly including the below belt seal assembly formed according to the process of FIG. 6A.

In further embodiments, in addition to forming the below belt seal assembly 70, such as also shown in the logic flow diagram of FIG. 6A, the method continues as shown in FIG. 6B to form the window seal assembly 40 and associated window sealing system 45 including the below belt seal assembly 70, the first extruded strip 58, and optionally the second extruded strip 60 and third extruded strip 62 and any further additional strips that define the upper glass run seal assembly 55. For ease of description, the method is described with respect to forming a window seal assembly 40 in FIG. 6B has only the first extruded strip 58 coupled to the below belt seal assembly 70 in steps 224 and 226 below, although in further embodiments additional strips such as the second extruded strip 60 and third extruded strip 62 can also be coupled to the first extruded strip 60 opposite the below belt seal assembly 70 with additional conventional steps extending from the non-conventional steps 224 and 226 of the present invention described below to form the window seal assembly 40 such as shown in FIGS. 1-3.

Referring now to FIG. 6B and in step 218, a separate molding apparatus (i.e., separate mold from the mold 500) is provided having a one or more receptacles defining a molding cavity.

In step 220, the below belt seal assembly 70 is positioned into the molding cavity of the separate mold within one of the one or more receptables 725, 730 contained in the molding cavity.

In step 222, the first extruded strip 58 and optionally any additional strips of material (i.e., the second extruded strip 60 and/or the third extruded strip 62 in the embodiment shown in FIGS. 1-3), depending upon the size and shape of the desired seal assembly 40, are formed as the upper glass run seal assembly 55 in a prior step in a conventional forming process such as via extrusion process. The strips 58, 60, 62 may be formed from a flexible polymeric material that is capable of forming a seal with the window 38. In certain embodiments, the flexible polymeric material is the same or a different material as the strip 72 used in the below belt seal assembly 70 as described above. By way of non-limiting example, one or more portions of the first extruded strip 58 and/or the second extruded strip 60 and/or the third extruded strip 62 could be manufactured via a plastic extrusion process utilizing one or more predetermined materials, such as from one or more types of EPDM rubber and/or TPV rubber as described above, and many include the carriers as described above. As opposed to forming the first extruded strip 58 and optionally any additional strips of material in step 222, the first extruded strip 58 and optionally any additional strips of material (i.e., the second extruded strip 60 and/or the third extruded strip 62) may simply be provided in alternative embodiments of the method 200 as the upper glass run seal assembly 55.

Next, in step 224, one of the strip ends 169 of the first extruded strip 58 into the molding cavity within a second one of the one or more receptacles in the separate molding apparatus with a portion of the base section or body 163 of the first extruded strip 58 engaging the below belt seal assembly 70 in the first receptacle. In particular, corresponding to the embodiment of FIGS. 1-3, with the strip end 169 of the first extruded strip 58 engaging the first strip end 76 of the below belt seal assembly 70.

Further, and optionally as a part of step 224, the second extruded strip 60 and/or third strip are loaded into additional receptacles with the second extruded strip 60 engaging the first extruded strip 58 as described above and with the third extruded strip 62 engaging the second extruded strip 60 (and in particular the strip end 171 of the second extruded strip 60 engaging the strip end 179 of the third extruded strip 62).

In step 226, material is directed into the molding cavity within the first one of the one or more receptacles in the separate mold to form a molding 90 bonding the first extruded strip 58 together with the below belt seal assembly 70 to form the window seal assembly 40.

The window seal assembly 40, and associated window seal system 45, formed in accordance with this method that includes a threaded nut 80 as the fastener 80 and the threaded bolt 205, may be then be introduced into the body 32 or door 34 of the vehicle 30 and secured to the body 32 or door of the vehicle 30 by threadingly engaging the bolt 205 within the access opening 190 of the threaded nut and engaging an end portion of the bolt 205 to the body 32 or door 34 to form the window sealing system 40 as described above.

In an alternative method to form the window seal assembly 40 of FIG. 3A from the window sealing system 45 including the below belt seal assembly 70 and upper glass run seal assembly 55, the method merely consists of positioning the strip end 159 of the first extruded strip 58 of material of the upper glass run seal assembly 55 adjacent to, and in certain embodiments is adjacent and spaced from the first strip end 76 of the extruded strip 72 of material of the below belt seal assembly 70 to form a gap 47. In certain embodiments, an adhesive can be applied to one or both of the strip ends 159, 76 to secure the first strip 58 to the strip 72 of the below belt seal assembly 70, while in other embodiments a fastener can alternatively be used alone or in conjunction with the adhesive to secure the first strip 58 to the strip 72 of the below belt seal assembly 70.

Figure 13:
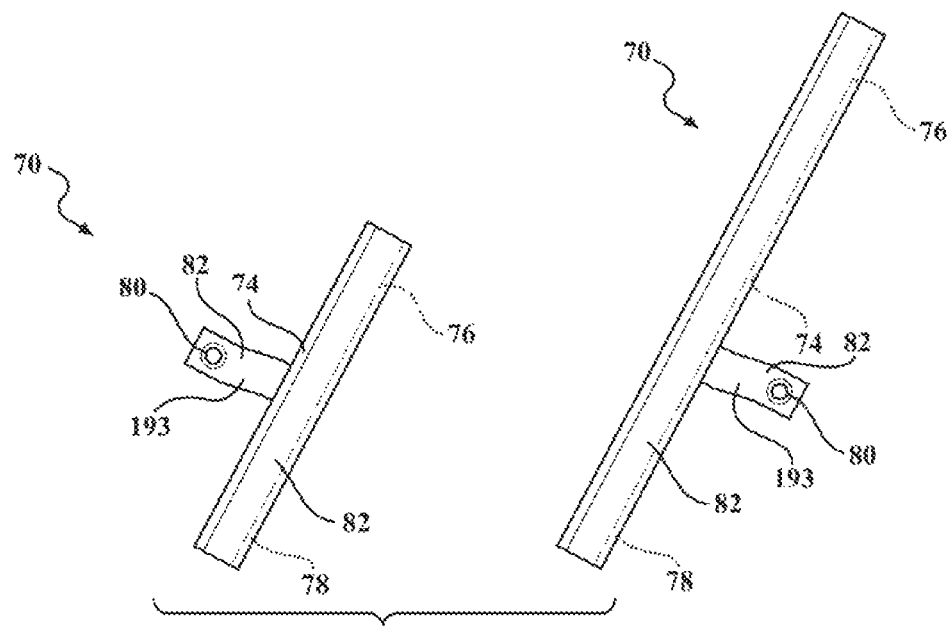
FIG. 13 is a side view alternative below bracket seal assemblies of the present invention.

In alternative embodiments, as shown in FIG. 13, alternative below belt seal assemblies 70 are provided in which the number, or location, of the bracket 193 and fasteners 80 may be different from the embodiments illustrated in FIGS. 4 and 11. In particular, a single bracket 193 and fastener 80 is illustrated on two below belt seal assemblies 70 in FIG. 13, as compared to the below belt seal assemblies 70 of FIGS. 4 and 11 that include two brackets 193 each having a single respective fastener 80.

In still further embodiments, the fastener 80 may be coupled to bracket 193 in accordance with the embodiments of FIGS. 4, 11 and 13 at any point and time during the assembly of the window seal assembly 40, including in a post-production step to the steps described above. Preferably, the fastener 80 is bonded or otherwise secured or fastened to bracket 193 in this post-production step prior to the window seal assembly 40 being installed into door 34 and/or the body 32 of the vehicle 30 as described above.

While the invention has been described with reference to the examples above, it will be understood by those skilled in the art that various changes may be made, and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all examples falling within the scope of the appended claims.

The invention claimed is:

1. A window sealing system for a vehicle having a movable window, said window sealing system comprising:
a below belt seal assembly for at least partially supporting the window in the vehicle, said below belt seal assembly comprising:
an extruded strip of material extending in length between a first strip end and a second strip end, said extruded strip of material having a base and first and second sides extending from said base with each of said base, said first side, and said second side having an inner surface defining a channel for receiving the moveable window and with said base having an engagement area defining an outer surface opposite said inner surface of said base,
said first side having an engagement area defining an outer surface opposite said inner surface of said first side with a first lip extending outwardly from said outer surface of said engagement area of said first side outside of said channel and with said first lip not facing said outer surface of said first side or said engagement area of said first side,
said second side having an engagement area defining an outer surface opposite said inner surface of said second side with a second lip extending outwardly from said outer surface of said engagement area of said second side outside of said channel and with said second lip not facing said outer surface of said second side or said engagement area of said second side,
a molding formed about said base and each of said first and second sides of said extruded strip of material and terminating at said engagement areas of said sides such that said molding is adjacent to but spaced from said first and second lips, and said molding forms a base molding, a first side molding, and a second side molding,
said molding bonded to said outer surfaces of said extruded strip of material at said engagement areas and forming at least one bracket extending outwardly from one of said sides,
a fastener attached to said bracket for facilitating mounting of the below belt seal assembly to the vehicle; and
an upper glass run seal assembly having one or more additional extruded strips of material with a portion of said upper glass run seal assembly disposed adjacent said below belt seal assembly for accepting the moveable window disposed within said below belt seal assembly,
wherein an inner surface of said base molding is bonded to said outer surface of said engagement area of said base of said extruded strip of material such that there are no cavities formed between said outer surface of said engagement area of said base of said extruded strip of material and said inner surface of said base molding, wherein an inner surface of said first side molding is bonded to said outer surface of said engagement area of said first side of said extruded strip of material such that there are no cavities formed between said outer surface of said engagement area of said first side of said extruded strip of material and said inner surface of said first side molding, and wherein an inner surface of said second side molding is bonded to said outer surface of said engagement area of said second side of said extruded strip of material such that there are no cavities formed between said outer surface of said engagement area of said second side of said extruded strip of material and said inner surface of said second side molding.

2. The window sealing system of claim 1, wherein said fastener is contained within said molding as said molding is formed about said base and each of said first and second sides of said extruded strip of material.

3. The window sealing system of claim 1, wherein said upper glass run seal assembly is spaced and adjacent to said below belt seal assembly.

4. The window sealing system of claim 1, wherein said first lip extends outwardly from said first side at a distance at least equal to a thickness of the molding disposed on said first side and wherein said second lip extends outwardly from said second side at a distance at least equal to the thickness of the molding disposed on said second side.

5. The window sealing system of claim 1, wherein said base, sides, and lips are formed of a polymeric material.

6. The window sealing system of claim 1, wherein said first side of said extruded strip of material includes a sealing lip extending inwardly towards said second side in a direction away from said first lip for engaging a portion of the movable window.

7. The window sealing system of claim 6, wherein said second side of said extruded strip of material includes a sealing lip extending inwardly towards said first lip for engaging a portion of the movable window.

8. The window sealing system of claim 1, wherein said molding forms a plurality of brackets forms a plurality of brackets, wherein the plurality of brackets include the at least one bracket, with each with each bracket having one or more fasteners where each of said plurality of brackets and fasteners are spaced from each other along said length.

9. A below belt seal assembly for at least partially supporting a window of a vehicle, said below belt seal assembly comprising:

an extruded strip of material extending in length between a first strip end and a second strip end, said extruded strip of material having a base and first and second sides extending from said base with each of said base, said first side, and said second side having an inner surface defining a channel for receiving a moveable window and with said base having an engagement area defining an outer surface opposite said inner surface of said base, said first side having an engagement area defining an outer surface opposite said inner surface of said first side with a first lip extending outwardly from said outer surface of said engagement area of said first side outside of said channel and with said first lip not facing said outer surface of said first side or said engagement area of said first side, said second side having an engagement area defining an outer surface opposite said inner surface of said second side with a second lip extending outwardly from said outer surface of said engagement area of said second side outside of said channel and with said second lip not facing said outer surface of said second side or said engagement area of said second side, a molding formed about said base and each of said first and second sides of said extruded strip of material and terminating at said engagement areas of said sides such that said molding is adjacent to but spaced from said first and second lips, and said molding forms a base molding, a first side molding, and a second side molding, said molding bonded to said outer surface of said extruded strip of material at said engagement areas and forming at least one bracket extending outwardly from one of said sides, and a fastener attached to said bracket for facilitating mounting of the below belt seal assembly to a vehicle, wherein an inner surface of said base molding is bonded to said outer surface of said engagement area of said base of said extruded strip of material such that there are no cavities formed between said outer surface of said engagement area of said base of said extruded strip of material and said inner surface of said base molding, wherein an inner surface of said first side molding is bonded to said outer surface of said engagement area of said first side of said extruded strip of material such that there are no cavities formed between said outer surface of said engagement area of said first side of said extruded strip of material and said inner surface of said first side molding, and wherein an inner surface of said second side molding is bonded to said outer surface of said engagement area of said second side of said extruded strip of material such that there are no cavities formed between said outer surface of said engagement area of said second side of said extruded strip of material and said inner surface of said second side molding.

10. The below belt seal assembly of claim 9, wherein said fastener is contained within said molding as said molding is formed about said base and each of said first and second sides of said extruded strip of material.

11. The below belt seal assembly of claim 9, wherein said first lip extends outwardly from said first side at a distance at least equal to a thickness of the molding disposed on said first side and wherein said second lip extends outwardly from said second side at a distance at least equal to the thickness of the molding disposed on said second side.

12. The below belt seal assembly of claim 9, wherein said base, sides, and lips are formed of a polymeric material.

13. The below belt seal assembly of claim 9, wherein said first side of said extruded strip of material includes a sealing lip extending inwardly towards said second side in a direction away from said first lip for engaging a portion of the movable window.

14. The below belt seal assembly of claim 13, wherein said second side of said extruded strip of material includes a sealing lip extending inwardly towards said first lip for engaging a portion of the movable window.

15. The below belt seal assembly of claim 9, wherein said molding forms a plurality of brackets, wherein the plurality of brackets include the at least one bracket, with each with each bracket having one or more fasteners where each of said plurality of brackets and fasteners are spaced from each other along said length.

\* \* \* \* \*

UNITED STATES PATENT AND TRADEMARK OFFICE
CERTIFICATE OF CORRECTION

Page 1 of 1

PATENT NO. : 12,240,300 B2
APPLICATION NO. : 17/574213
DATED : March 4, 2025
INVENTOR(S) : Thomas Groters et al.

It is certified that error appears in the above-identified patent and that said Letters Patent is hereby corrected as shown below:

In the Claims

Column 15, Lines 44-45 Claim 8: delete "forms a plurality of brackets forms a plurality of brackets" and insert therefor -- forms a plurality of brackets --.

Column 15, Line 46 Claim 8: delete "with each with each" and insert therefor -- with each --.

Column 16, Line 67 - Column 17, Line 1 Claim 15: delete "with each with each" and insert therefor -- with each --.

Signed and Sealed this
Eleventh Day of November, 2025

John A. Squires
*Director of the United States Patent and Trademark Office*